(12) United States Patent
Dastidar et al.

(10) Patent No.: US 7,139,859 B2
(45) Date of Patent: Nov. 21, 2006

(54) INTER-QUEUE ORDERING MECHANISM

(75) Inventors: Jaideep Dastidar, Houston, TX (US);
Ryan J. Hensley, Houston, TX (US);
Michael Ruhovets, Houston, TX (US);
An H. Lam, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1080 days.

(21) Appl. No.: 10/039,130

(22) Filed: Dec. 31, 2001

(65) Prior Publication Data
US 2003/0126029 A1 Jul. 3, 2003

(51) Int. Cl.
*G06F 13/36* (2006.01)
(52) U.S. Cl. .................. 710/306; 710/311; 710/315
(58) Field of Classification Search ............... 710/306, 710/311–315, 260, 52
See application file for complete search history.

(56) References Cited

U.S. PATENT DOCUMENTS 5,881,254 A * 3/1999 Corrigan et al. ............ 710/306
6,502,157 B1 * 12/2002 Batchelor et al. ........... 710/310
6,629,179 B1 * 9/2003 Bashford ..................... 710/260
6,763,402 B1 * 7/2004 Talati .......................... 710/36

* cited by examiner

Primary Examiner—Tim Vo

(57) ABSTRACT

A device for implementing transaction ordering enforcement between different queues of a computer system interconnect using an inter-queue ordering mechanism. The device includes first and second circular queues and input and output counters. The queues have an ordering dependency requirement between them such that entries in the second queue are not allowed to pass entries in the first queue. One requirement is that an entry in the second queue cannot be dequeued before an entry that was placed earlier in the first queue is dequeued. Another requirement is that an entry in the second queue cannot be dequeued before an entry that was placed earlier in the first queue is dequeued and then acknowledged as completed. The input and the output counters increment whenever an entry is enqueued to or dequeued from the first queue, respectively. The device may be implemented PCI and PCI-X systems or other interconnect systems.

44 Claims, 3 Drawing Sheets

INTER-QUEUE ORDERING MECHANISM

CROSS-REFERENCE TO RELATED APPLICATIONS

Not applicable.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention is related to enforcing ordering rules between different transaction queues in an interconnect of a computer system that requires transaction ordering, such as the Peripheral Component Interconnect (PCI).

2. Description of the Related Art

Many industry standard and proprietary interconnects require transactions on the interconnect to be ordered according to certain rules to maintain memory consistency throughout the system or enable proper functioning of cache coherency protocols. Typically, all outstanding transaction ordering is accomplished using a transaction-ordering queue, while the individual transactions themselves are placed in multiple parallel queues. There must be a pointer in each entry of the ordering queue to point to the corresponding transaction in its own queue. The transactions must be removed in order from the transaction-ordering queue, but a transaction that lacks the resources to be executed is not allowed to block subsequent transactions and still has to be removed from the transaction-ordering queue. Its status must be updated (i.e., marked) in its own queue to show that it has no more dependencies on other queues. The current technique thus requires extra overhead and increases costs.

BRIEF SUMMARY OF THE INVENTION

Embodiments of the invention feature a device for implementing an inter-queue ordering mechanism between any pair of different queues of an interconnect of a computer system. The device includes a first circular queue and a second circular queue in any given queue pair. The first and second circular queues have an ordering dependency between them, such that entries in the second circular queue are not allowed to pass entries in the first circular queue. The device also includes an input counter and an output counter. The input and the output counters increment whenever an entry is enqueued to or dequeued from the first circular queue, respectively.

Embodiments of the invention feature a computer system in which an inter-queue ordering mechanism between different queues of an interconnect is implemented. The computer system includes a central processing unit(s) and core logic connected to the central processing unit(s). The core logic includes a first circular queue and a second circular queue. The first and second circular queues have an ordering dependency between them such that entries in the second circular queue are not allowed to pass entries in the first circular queue. The computer system also includes an input counter and an output counter. The input and the output counters increment whenever an entry is enqueued to or dequeued from the first circular queue, respectively.

Embodiments of the invention feature a method of implementing an inter-queue ordering mechanism between different queues of a computer system. The method includes enqueuing transaction entries in a first circular queue in the computer system and enqueuing additional transaction entries in a second circular queue in the computer system. The method also includes ordering the transaction entries in the first and the second circular queues to prevent the additional transaction entries in the second circular queue from passing the transaction entries in the first circular queue. The method further includes incrementing an input counter and an output counter whenever an entry is enqueued to or dequeued from the first circular queue, respectively.

BRIEF DESCRIPTION OF THE SEVERAL VIEWS OF THE DRAWINGS

A better understanding of the present invention can be obtained when the following detailed description of the preferred embodiment is considered in conjunction with the following drawings, in which.

DETAILED DESCRIPTION OF THE INVENTION

In accordance with embodiments of the invention, a device implements transaction queues as simple first-in-first-out (FIFO) memory (e.g., RAM, flip-flops, register files, or the like building blocks, plus enqueue and dequeue pointers), or as simple FIFO memory plus other randomly accessed memory elements for handling out of order transaction completions. The device does not require an extra transaction re-ordering queue and its associated pointers and other logic. Eliminating the extra hardware overhead reduces implementation effort and gate count, and thus cost. The device provides transaction order enforcement between different queues by establishing an inter-queue ordering mechanism. The device operates by ensuring that a first queue can proceed without regard to another queue, while that other queue's entries are not allowed to pass the entries of the first queue, and thus the second queue is dependent on the first queue.

Prior reordering queues force all queues to be processed one at a time. Only one queue can move forward in any given clock cycle. According to the present invention, queues that are not ordered relative to each other, but only relative to different queues, can move forward simultaneously and independently of each other, thus increasing throughput. Prior ordering requirements entail transactions being acknowledged before a later transaction in a different queue is dequeued. The reordering queue has to wait for each transaction to be acknowledged before removing it, thus dramatically decreasing throughput. According to the present invention, transactions that require acknowledge can be dequeued without waiting for an acknowledge for a previous transaction in the same queue, thus preserving the maximum possible throughput.

Figure 1:
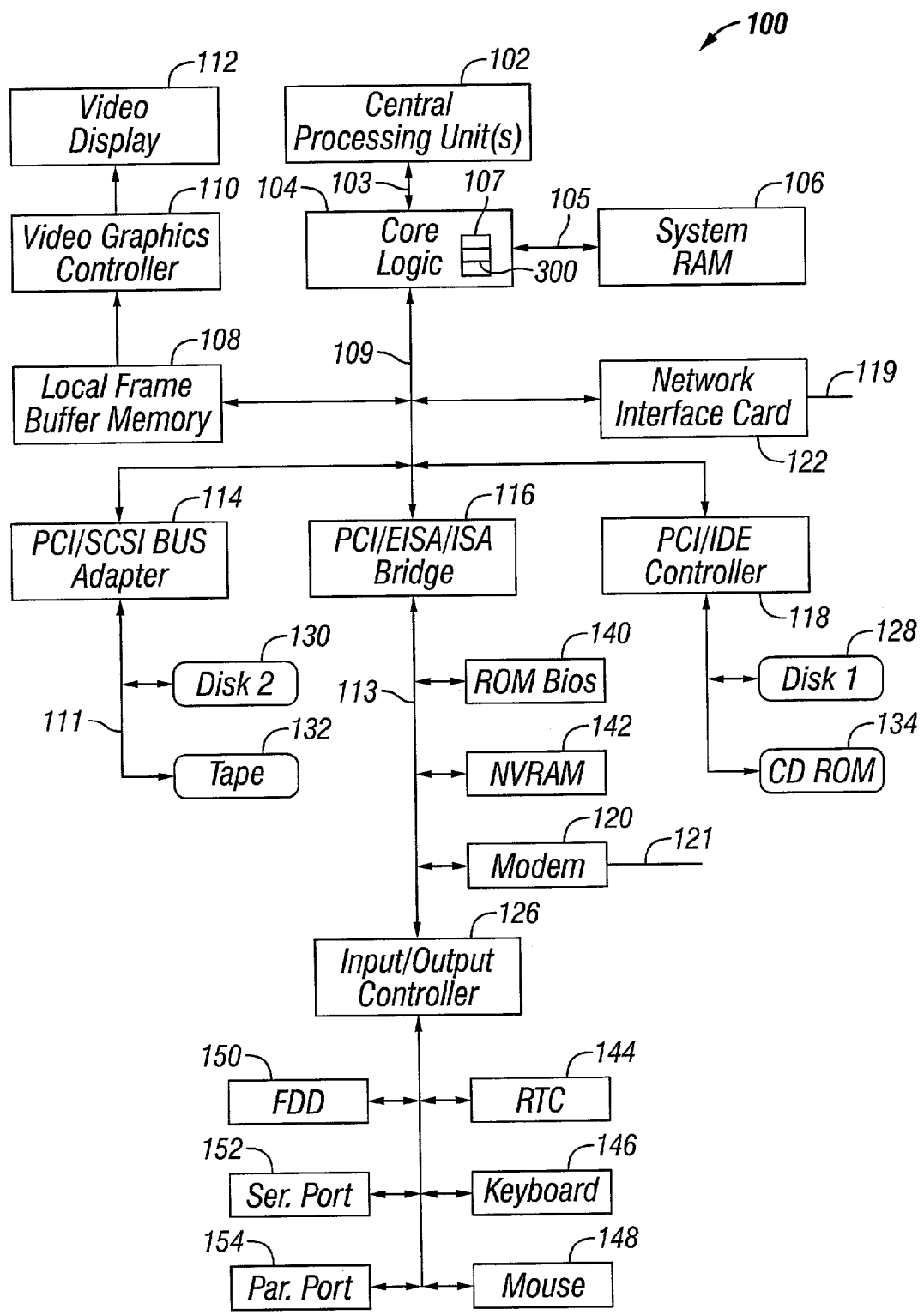
FIG. 1 is an exemplary schematic block diagram of a computer system that supports an inter-queue ordering mechanism, in accordance with an embodiment of the invention.

FIG. 1 shows an exemplary schematic block diagram of a computer system according to the present invention. The computer system is generally indicated by the numeral 100 and includes central processing unit(s) (CPU(s)) 102, core logic 104 ("North Bridge"), system random access memory (RAM) 106, a video graphics controller 110, a local frame buffer 108, a video display 112, a PCI/SCSI bus adapter 114, a PCI/EISA/ISA bridge 116 ("South Bridge"), a PCI/IDE controller 118, and, optionally, a network interface card (NIC) 122. Single or multi-level cache memory (not illustrated) may also be included in the computer system 100, according to the current art of microprocessor computer systems. The CPU 102 may be a plurality of CPUs 102 in a symmetric or asymmetric multi-processor configuration.

The CPU 102 is connected to the core logic 104 through a CPU host bus 103. The system RAM 106 is connected to the core logic 104 through a memory bus 105. The core logic 104 includes a host-to-PCI bridge 107 between the host bus 103, the memory bus 105 and a PCI bus 109 operating under the *PCI Local Bus Specification, Revision* 2.2 (the general PCI specification), which is incorporated by reference herein in its entirety. More than one PCI bus is contemplated as well as PCI-to-PCI bridges (not illustrated), which are included in the scope and intent of the present invention. The local frame buffer 108 is connected between the video graphics controller 110 and the PCI bus 109. The PCI/SCSI bus adapter 114, PCI/EISA/ISA bridge 116, PCI/IDE controller 118 and the NIC 122 are connected to the PCI bus 109. Some of the PCI devices, such as the Video controller 110 and NIC 122, may plug into PCI connectors on a motherboard (FIG. 2) of the computer system 100. The NIC 122 may be connected to a local area network 119.

Hard disk 130 and tape drive 132 are connected to the PCI/SCSI bus adapter 114 through a SCSI bus 111. The PCI/EISA/ISA bridge 116 is connected over an EISA/ISA bus 113 to a ROM BIOS 140, non-volatile random access memory (NVRAM) 142, modem 120, and input-output controller 126. The modem 120 is connected to a telephone line 121. The input-output controller 126 is interfaced with a keyboard 146, real time clock (RTC) 144, mouse 148, floppy disk drive (FDD) 150, serial port 152, and parallel port 154. The EISA/ISA bus 113 is a slower information bus than the PCI bus 109, but its interfacing cost is less.

When the computer system 100 is first turned on, start-up information stored in the ROM BIOS 140 is used to commence operation. Basic setup (BIOS) instructions are stored in the ROM BIOS 140 so that the computer system 100 can load more complex operating system (OS) software from a memory storage device, such as the disk 130. Before the operating system software can be loaded, however, certain hardware in the computer system 100 is configured to transfer information properly from the disk 130 to the CPU 102. In the computer system 100 illustrated in FIG. 1, the PCI/SCSI bus adapter 114 is configured to respond to commands from the CPU 102 over the PCI bus 109 and transfer information from the disk 130 to the CPU 102 via buses 109 and 103. The PCI/SCSI bus adapter 114 is a PCI device and remains platform independent. Therefore, separate hardware independent commands are used to setup and control any PCI device in the computer system 100. These hardware independent commands, however, are located in PCI BIOS contained in the computer system ROM BIOS 140. The PCI BIOS is hardware specific firmware, but meets the general PCI specification. Plug and play and PCI devices in the computer system are detected and configured when a system configuration program is executed. The results of the plug and play and PCI device configurations are stored in the NVRAM 142 for later use by the startup programs in the ROM BIOS 140 and the PCI BIOS that configure the necessary computer system 100 devices during startup. Also during startup, a built-in-self-test (BIST) may perform diagnostic testing of components, such as PCI devices, in the computer system.

Figure 2:
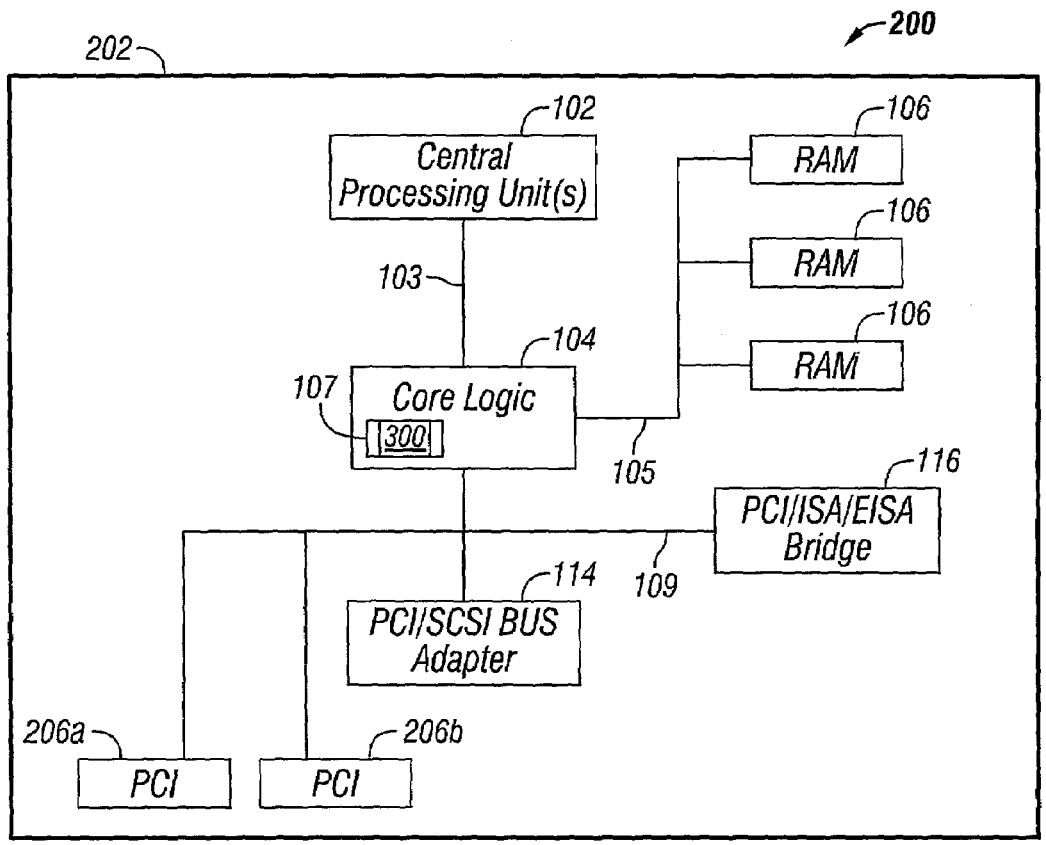
FIG. 2 is an exemplary schematic diagram of a printed circuit motherboard of the computer system of FIG. 1.

FIG. 2 shows a schematic diagram of an exemplary computer system motherboard according to FIG. 1. The computer system motherboard 200 includes printed circuit board 202 on which components and connectors are mounted. The printed circuit board 202 includes conductive printed wiring used to interconnect these components and connectors. The conductive printed wiring (illustrated as the buses 103, 105 and 109) may be arranged into signal buses having controlled impedance and signaling characteristics. Illustrated on the printed circuit board 202 are the core logic 104, CPU(s) 102, RAM 106, embedded PCI/ISA/EISA bridge 116, embedded PCI/SCSI bus adapter 114, and PCI connectors 206a, 206b. The motherboard 200 may be assembled into a case with a power supply, disk drives, etc. (not illustrated), which form the computer system 100 of FIG. 1.

The present invention provides support for an order enforcement mechanism between different queues in an interconnect bus bridge, such as a PCI bus bridge of a computer system, for ordering transaction handling. The present invention can be implemented in the computer system 100 of FIGS. 1 and 2 in the core logic 104, which may be an Application Specific Integrated Circuit (ASIC), as will be appreciated by those skilled in the art, as well as in a variety of other computer systems and/or computer buses. For example, the present invention could be implemented in a computer system employing a serial point-to-point bus, such as 3GIO by Intel Corporation or HyperTransport™ by the HyperTransport Technology Consortium, or another one employing a parallel bus, such as extended PCI (PCI-X) operating under the *PCI-X Addendum to the PCI Local Bus Specification, Revision* 1.0 (the PCI-X specification).

Figure 3:
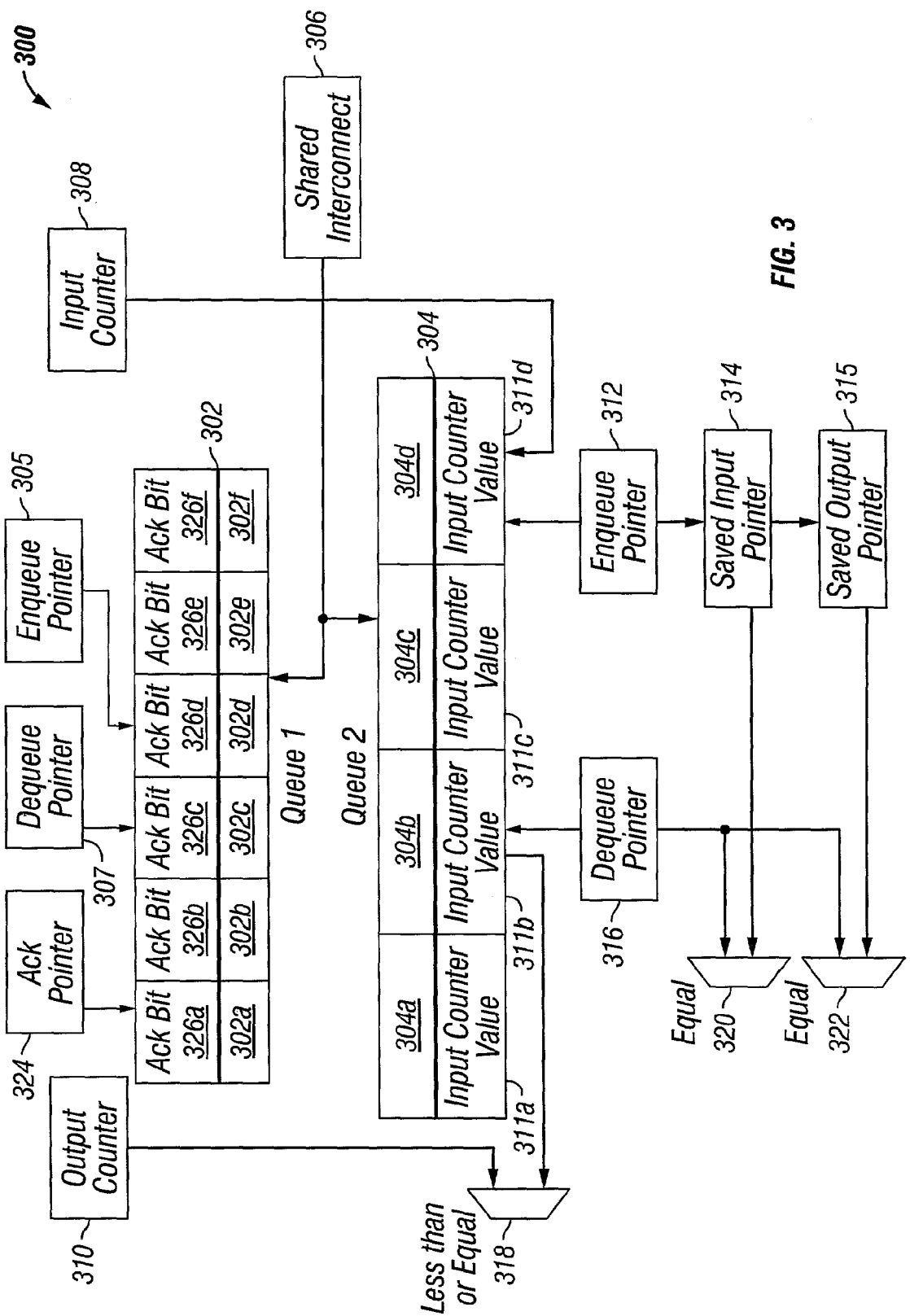
FIG. 3 is an exemplary schematic block diagram of a device that supports an inter-queue ordering mechanism between different queues of an interconnect of a computer system, in accordance with an embodiment of the invention.

In one embodiment, as shown in FIGS. 1 and 2, and in the schematic block diagram of FIG. 3, a device 300 can be incorporated in the core logic 104 in the host-to-PCI bridge 107, of the computer system 100. The host-to-PCI bridge 107 is merely exemplary of a type of PCI bus bridge in which the present invention can be implemented. Other types of PCI bus bridges are contemplated, such as, but not limited to, PCI-to-PCI bridges. The device 300 has an interface that includes two circular queues 302 and 304 with an ordering dependency between them, such that entries in the second queue 304 are not allowed to pass entries in the first queue 302. The queues 302 and 304 can be implemented in FIFO memory in the core logic 104. Such FIFO memory can use RAM, flip-flops, register files, or the like as a building block. Also, the queue 302 can include randomly accessed memory elements for handling out of order transaction completions, as will be described below. Although only two queues are shown in FIG. 3, it is to be understood that the present invention can work for any pair of queues, even in a multi-queue system, as long as one queue has a dependency on another queue. Thus, for example, a first queue can have a dependency on a second queue and on a third queue, and the second queue, a dependency on a third queue, and so on. The present invention can be implemented in these embodiments between the first and the second queues and/or between the second and the third queues, and/or between the first and third queues, etc. These multi-queue embodiments are included within the scope and intent of the present invention. Note that for these multi-queue embodiments, for any dependent queue having a dependency on other queues, an entry in the dependent queue cannot be dequeued unless the requirements for dequeuing that entry are met with respect to every queue that the dependent queue depends on as described herein.

Two types of ordering requirements may be used for dequeuing from the queues 302 and 304, in accordance with embodiments of the invention. These ordering requirements normally are identified at the time of the design of the computer system 100 and would not need to be loaded, i.e. they would be embedded, for example, in the design of the host-to-PCI bridge 107 in ASIC logic. However, the ordering requirements could be made programmable by software, in which case they could be stored in the system ROM, such as the ROM BIOS140, or on a disk, or the like, from which software would load them into configuration registers, for example, inside the ASIC of the host-to-PCI bridge 107. Even in the same system, some queues may need the first type of ordering requirement and some the second type, depending on the type of transactions in those queues. The first type provides that an entry in the second queue 304 cannot be dequeued before another entry that was placed earlier in the first queue 302 is dequeued. The second type provides that an entry in the second queue 304 cannot be dequeued before another entry that was placed earlier in the first queue 302 is dequeued and then acknowledged as having been completed.

The queue 302 includes an enqueue pointer 305 and a dequeue pointer 307. The pointers 305 and 307, as well as other pointers discussed herein, can be constructed of counters in the core logic 104, as will be appreciated by those skilled in the art. Transaction entries can be enqueued to the queue 302 using the enqueue pointer 305, and dequeued from the queue 302 using the dequeue pointer 307. The queues 302 and 304 are connected to a shared interconnect 306 at an input end. The shared interconnect is, for example, the PCI bus 109 in the computer system 100 in FIGS. 1 and 2. As will be appreciated by those skilled in the art, the output sides of queues 302 and 304 are connected through some interconnect(s) (not shown) to either the host bus 103 or to memory bus 105, or to both. The comparators 318, 320, and 322 can be constructed of gate logic in the core logic 104, for example, in the ASIC, as discussed above.

The device 300 includes an input counter 308 and an output counter 310 for the first queue 302. The counters 308 and 310 can be, for example, constructed of flip-flops with gates in the core logic 104. Both of the counters 308 and 310 start at 0 initially, and both have the same maximum value after which each rolls back over to zero (0). The maximum value and rolling back to 0 represents the cyclical use of the circular queue 302, as will be appreciated by those skilled in the art. The maximum value must be no less than the depth of the first queue 302 minus 1. In other words, the counters 308 and 310 can take on integer values from 0 to N−1 (e.g., 0 to 7), where N is the depth (or size) of the queue 302 (e.g., 8). The depth or size N of the queue 302 indicates that an integer number of N entries is held in the queue 302 when the full condition is reached. The input counter 308 is incremented when a transaction is placed or enqueued in order of arrival in one of entries 302a–f in the first queue 302 (i.e., first transaction is enqueued in entry 302a, second in entry 302b, etc.), as the queue 302 fills up. The output counter 310 is incremented when an enqueued entry is dequeued or dequeued and acknowledged, depending on the ordering requirement, from the first queue 302 (i.e., from one of the entries 302a–f), as indicated above.

Transaction entries also are placed in the second queue 304 in order of arrival. As these entries are placed in the second queue 304, the values of the input counter 308 at the corresponding clock edges also are stored as the input counter values 311a–f, in order, in the second queue 304. For example, the first transaction is enqueued in entry 304a, the second in entry 304b, etc., while the corresponding first counter value is stored as the value 311a, the second as the value 311b, etc., and so on.

It is useful to keep track of the next entry position of the queue 304 when the input counter 308 rolls back over to 0. When the input counter 308 rolls back over to 0, the normal dequeuing rule for the queue ordering operation is broken. Special dequeuing rules, as described below, must be applied. This is required to implement the ordering requirements of the present invention. On the next clock edge after the input counter 308 rolls over to 0, a current enqueue pointer 312 of the second queue 304, which points to the entry to be filled next of the entries 304a–d in the queue 304, is saved as a saved input pointer 314. The saved input pointer 314 holds (i.e., identifies) the place in the queue 304 of the particular entry of the entries 304a–d where the input counter 308 rolls back to 0, or that information would be lost upon further enqueuing of entries. Each time the input counter 308 rolls back over to 0, the saved input pointer 314 marks the entries in the queue 304 which can not pass the group of N entries in the queue 302 that the input counter 308 just finished counting. When the output counter 310 also rolls over to 0, those N entries that were previously in queue 302 are all gone. On the next clock edge after the output counter 310 rolls back over to 0, the saved input pointer 314 is saved again as a saved output pointer 315. In embodiments for which pointers are constructed of registers and logic gates (counters), this saving again is the same as pipelining to the next register, as will be appreciated by those skilled in the art. Thus, the place where the input counter 308 has rolled over to 0 previously is still held for referencing the location in the queue 304 where that roll over occurred. Knowing the referenced entry location in the queue 304 where the input counter 308 rolls over to 0 allows for the determination of which entries in the queue 304 are newer than some of the entries in the queue 302. Recall that all older entries in the queue 302 must be allowed to dequeue (or dequeue and acknowledge) before relatively newer entries in the queue 304. The enqueue pointer 312 value has to be saved twice so that the older value does not get wiped out by the newer value saved when the input counter 308 rolls over again, because the older value is still needed until the output counter 310 rolls over again, as will be described below.

The foregoing provides a procedure for filling the queue entries in the queues 302 and 304, and how the input counter 308 and the output counter 310 are incremented, according to the present invention. As mentioned above, dequeuing requires special dequeuing rules. The normal dequeuing rule is that one or more of the entries 304a–d previously filled in the second queue 304 initially cannot be dequeued until their stored counter values (i.e., the corresponding ones of the stored counter values 311a–d) become less than or equal to the output counter 310, as determined by comparator 318. That is because newer entries in the queue 304 are dequeued only after older entries in the queue 302 are dequeued, as indicated above. A second queue dequeue pointer 316 points to the next entry to be dequeued from the queue 304. If the input counter 308 has rolled over to 0 and the dequeue pointer 316 becomes equal to the saved input pointer 314, the entry (i.e., the one of the entries 304a–d that corresponds to the saved input pointer 314) in the second queue 304 cannot be dequeued until at the earliest the clock after the output counter 310 also rolls over to 0, when the updated saved output pointer 315 becomes available. If the dequeue pointer 316 is equal to saved input pointer 314 when the output counter 310 rolls over, then the dequeue pointer 316 now becomes equal to saved output pointer 315. In this case the entry on queue 304 pointed to by dequeue pointer 316 can be dequeued as normal, i.e. only if its counter value 311a–d is less than or equal to the output counter 310. On the other hand, if dequeue pointer 316 is not equal to saved input pointer 314 when the output counter 310 rolls over, then the entries on the queue 304 can be dequeued without regard to their counter values 311a–d until the dequeue pointer 316 becomes equal to saved output pointer 315. Once the pointers 316 and 315 become equal, as determined by the comparator 322, the entries on the queue 304 can be dequeued as normal, i.e., only if the corresponding counter value 311a–d is less than or equal to the output counter 310, as determined by the comparator 318. This proceeds until the input counter 308 rolls over again and the dequeue pointer 316 becomes equal to the saved input pointer 314 and so on.

Figure 4:
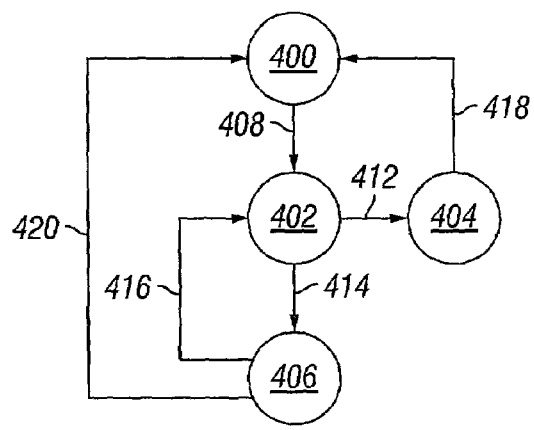
FIG. 4 is a state diagram for dequeuing entries from a queue in accordance with an embodiment of the invention.

A state diagram for dequeuing that implements the techniques above described is shown in FIG. 4 for clarity. The normal dequeueing rule for the queue 304 applies in an initial state 400. When input counter 308 rolls over, a transition 408 is taken from a state 400 to a state 402. In the state 402, the normal dequeuing rule for the queue 304 is still followed until the dequeue pointer 316 becomes equal to the saved input pointer 314. At this point, dequeuing from the queue 304 stops and a transition 412 is taken to a state 404. On the other hand, if in the state 402 the output counter 310 rolls over before or on the same clock that the dequeue pointer 316 becomes equal to the saved input pointer 314, a transition 414 is taken to a state 406. Note that the normal dequeueing rule for the queue 304 still applies on the clock that the transition 414 is taken. In the state 404, no entries can be dequeued from the queue 304 until the output counter 310 rolls over. A transition 418 is taken from the state 404 to the state 400 when the counter 310 rolls over. Note that the normal dequeuing rule for the queue 304 applies on the clock that the transition 418 is taken. In the state 406, the entries can be dequeued from the queue 304 without regard to their counter values 311a–d until the dequeue pointer 316 becomes equal to the saved output pointer 315. At this point, a transition 416 is taken from the state 406 to the state 402 if the input counter 308 was the last one to roll over. Otherwise a transition 420 is taken to the state 400. Note that on the clock that the transition 416 is taken, the dequeueing rules for the queue 304 are the same as in the state 402. On the clock that the transition 420 is taken, the normal dequeuing rule for the queue 304 applies.

Note, in the foregoing, if the input counter 308 rolls over (i.e. the saved input pointer 314 is updated) on the clock edge that the queue 304 is full (and thus enqueue pointer 312 is equal to the dequeue pointer 316), the normal dequeuing rule still applies even though the dequeue pointer 316 becomes equal to the saved input pointer 314. In other words, dequeueing does not need to wait until the output counter rolls over. That is because the entry pointed to by the dequeue pointer 316 was enqueued already before the enqueue pointer 312 advanced onto this entry and the queue 304 became full. Referring again to FIG. 4, that means the transition 412 is not taken if the transition 408 occurred when the queue 304 was full and the dequeue pointer 316 has not been advanced since the clock of the transition 408. In that case, the transition 412 could occur only after the dequeue pointer 316 has been advanced at least once and the dequeue pointer 316 again becomes equal to saved input pointer 314.

Similarly, if the output counter 310 rolls over (i.e. the saved output pointer 315 is updated) and all of the following holds:

(1) The dequeue pointer 316 becomes equal to the saved output pointer 315;
(2) The last time the saved input pointer 314 was updated the queue 304 was full; and
(3) The dequeue pointer 316 has not been advanced since the saved input pointer 314 was updated, then the dequeueing can proceed without comparing stored input counter values 311a–d to the output counter 310 until the dequeue pointer 316 is advanced at least once and later becomes equal to the saved output pointer 315. At that point, the comparison of the stored input counter values 311a–d to the output counter 310 resumes, i.e. back to the normal dequeuing rule. This is because under these conditions the queue 304 was full when the input counter 308 rolled over, and stayed full until the output counter 310 rolled over, since the dequeue pointer 316 was not advanced. Thus, all the entries on queue 304 were enqueued before the input counter 308 rolled over, and therefore can all be dequeued unconditionally once the output counter 310 rolls over.

Referring again to FIG. 4, that means neither the transition 420 nor the transition 416 can be taken if the last transition 408 occurred when the queue 304 was full and the dequeue pointer 316 has not been advanced since the clock on which the last transition 408 occurred. In that case, the transitions 420 or 416 can only take place after the dequeue pointer 316 is advanced at least once and the dequeue pointer 316 again becomes equal to saved output pointer 315.

For the second type of ordering requirement, the entries 302a–f from the first queue 302 must not only be dequeued before later entries in the queue 304, but they also must be acknowledged. In the case that the acknowledges come back in order and an ack pointer (described below) is not used, the entries 302a–f from the first queue 302 cannot be dequeued if the number of those sent out, but unacknowledged entries is the maximum counter value plus 2 minus the queue depth of the first queue 302 (i.e., M+2−N, where M is the maximum counter value). This is because the output counter 310 does not get incremented until the acknowledge is received, and the input counter 308 could roll over twice or more before the output counter 310 rolls over. The dequeueing rules above only work if the input counter 308 rolls over only once before the output counter 310 rolls over. For example, if M=N−1, the entries from the first queue 302 will not be dequeued if the number of sent out, but unacknowledged, entries in the first queue 302 is equal to 1. Of course, the maximum output counter value can be increased with a larger output counter 310, which will allow dequeuing more than 1 entry sent out, but unacknowledged. For example, if the maximum output counter value is 2N−1, corresponding to twice the depth of the queue 302, then the entries in the queue 302 cannot be dequeued if the number of sent out, but unacknowledged entries is equal to 2N−1+2−N=N+1, which means that N+1 entries from the queue 302 can be unacknowledged before dequeuing has to stop. This makes sure that the input counter 308 never rolls over more than once before the output counter 310 rolls over.

Referring to FIG. 3, the first queue 302 can use an ack pointer 324 to maintain the second ordering requirement, in addition to the normal dequeue pointer 307, in accordance with an embodiment of the invention. The ack pointer 324 is used if acknowledges for the first queue 302 return in a different order (i.e., out of order) compared to the entries 302a–f being dequeued from the first queue 302. An entry (i.e., one of the entries 302a–f) that is acknowledged is marked as such by setting its corresponding ack bit 326a–f, as will be appreciated by those skilled in the art. The ack bits 326a–f can be constructed of RAM, flip-flops, register files, or other randomly accessed memory elements, or the like, because they may be set out of order (i.e., randomly set). The dequeue pointer 307 is advanced along the queue 302 when an entry (one of the 302a–f entries) is dequeued, and the ack pointer 324 is advanced if the entry it points to is marked as acknowledged. The ack bit in the entry is reset when the ack pointer 324 is advanced. The output counter 310 is incremented when the ack pointer 324 is advanced. The ack pointer 324 is not allowed to pass the dequeue pointer 307, the dequeue pointer 307 is not allowed to pass the enqueue pointer 305, and the enqueue pointer 305 is not allowed to pass the ack pointer 324. The queue full condition exists in the queue 302 if the enqueue pointer 305 is incremented and becomes equal to the ack pointer 324. The queue empty condition exists in the queue 302 if the dequeue pointer 307 is incremented and becomes equal to the enqueue pointer 305. Detecting the full/empty conditions is necessary for correct operation of the queues, so that, for example, an entry that is waiting for acknowledge is not overwritten by a new entry or an empty entry is not dequeued. This is similar to the usual operation of FIFO queues and usual detection of full/empty conditions, except that FIFO queues usually do not have an ack pointer in addition to the dequeue/enqueue pointers. The second type of ordering requirement necessitates the techniques of the present invention for incrementing the output counter 310 above. Note, if the first type of ordering requirement is used instead, or the acknowledges always come back in order, there is no need for the ack pointer 324 or the ack bits 326a–f. For acknowledges always coming back in order, the dequeue pointer 307 is advanced when an entry is dequeued, and the output counter 310 is incremented when the acknowledge is received.

The foregoing disclosure and description of the embodiments are illustrative and explanatory thereof. Various changes in the components, circuit elements, circuit configurations, signals, and signal connections, as well as in the details of the illustrated circuitry and construction and method of operation may be made without departing from the spirit and scope of the invention. For example, the components discussed as being constructed in the core logic may be constructed externally to the core logic and still be considered part of the computer system implementing the present invention. Another example would be to apply various standard circuit design optimization techniques (e.g., when the queues and/or the ordering dependency use look-ahead and/or pipelining), as will be appreciated by those skilled in the art. The optimization techniques would be used to change the clock edge on which the various actions described above, according to the invention, such as saving in the saved input pointer 314 or the saved output pointer 315, or making state transitions as in FIG. 4, are taken relative to the clock edge on which events, such as the counters 308 or 310 rolling over, are observed.

We claim:

1. A device for implementing an inter-queue ordering mechanism between different queues of an interconnect of a computer system, comprising:
   a first circular queue;
   a second circular queue, the first and second circular queues adapted to have an ordering dependency between them, wherein entries in the second circular queue are not allowed to pass entries in the first circular queue;
   a first counter; and
   a second counter, the first and the second counters adapted to increment whenever an entry is enqueued to or dequeued from the first circular queue.

2. The device of claim 1, wherein an entry in the second circular queue cannot be dequeued before an entry that was placed earlier in the first circular queue is dequeued.

3. The device of claim 1, wherein an entry in the second circular queue cannot be dequeued before an entry that was placed earlier in the first circular queue is dequeued and then acknowledged as having been completed.

4. The device of claim 1, wherein the dependency ensures that one of the first and second circular queues can proceed with an interconnect transaction as long as the second circular queue entries are not allowed to pass older entries of the first circular queue.

5. The device of claim 1, wherein the first and second circular queues are comprised in a peripheral component interconnect (PCI) system.

6. The device of claim 1, wherein the first and second circular queues are comprised in an order enforcement mechanism.

7. The device of claim 1, wherein the first counter rolls over to zero only once before the second counter rolls over to zero.

8. The device of claim 1, wherein the first and the second counters roll over to zero after reaching respective maximum values.

9. The device of claim 8, further comprising a saved input pointer that points to an entry in the second circular queue whenever the first counter rolls over to zero.

10. The device of claim 9, further comprising a saved output pointer that points to the same entry in the second circular queue until the saved input pointer is updated again.

11. The device of claim 1, wherein the first and second circular queues are incorporated in a North Bridge of the computer system.

12. The device of claim 11, wherein the North Bridge comprises a host-PCI bridge.

13. The device of claim 1, wherein the first and second circular queues comprise first-in-first-out (FIFO) memory.

14. The device of claim 13, wherein the first circular queue further comprises randomly accessed memory elements.

15. The device of claim 13, wherein the FIFO memory comprises random access memory (RAM), flip-flops, or register files as a building block.

16. The device of claim 1, further comprising acknowledge bits in the first circular queue for maintaining the ordering dependency.

17. The device of claim 16, wherein the acknowledge bits comprise random access memory (RAM), flip-flops, or register files.

18. The device of claim 1, further comprising other circular queues, wherein the second circular queue has a dependency on the other circular queues such that an entry in the second circular queue cannot be dequeued unless requirements for dequeuing that entry are met with respect to every queue that the second circular queue depends on.

19. A computer system implementing an inter-queue ordering mechanism between different queues of an interconnect, comprising:
   a central processing unit;
   core logic connected to the central processing unit, the core logic including:
      a first circular queue;
      a second circular queue, the first and the second circular queues having an ordering dependency between them, wherein entries in the second circular queue are not allowed to pass entries in the first circular queue;
      a first counter; and
      a second counter, the first and the second counters adapted to increment whenever an entry is enqueued to or dequeued from the first circular queue.

20. The computer system of claim 19, wherein the first and second circular queues comprise first-in-first-out (FIPO) memory.

21. The computer system of claim 19, wherein the first circular queue further comprises randomly accessed memory elements.

22. The computer system of claim 19, wherein the FIFO memory comprises random access memory (RAM), flip-flops, or register files as a building block.

23. The computer system of claim 19, wherein an entry in the second circular queue cannot be dequeued before an entry that was placed earlier in the first circular queue is dequeued.

24. The computer system of claim 19, wherein an entry in the second circular queue cannot be dequeued before an entry that was placed earlier in the first circular queue is dequeued and then acknowledged as having been completed.

25. The computer system of claim 24, further comprising a dequeue pointer, wherein the dequeue pointer is advanced when an entry is dequeued from the first circular queue, and wherein the second counter is incremented when an acknowledge signal is received.

26. The computer system of claim 19, wherein the dependency ensures that one of the first and second circular queues can proceed with an interconnect transaction as long as the second circular queue entries are not allowed to pass older entries of the first circular queue.

27. The computer system of claim 19, wherein the first and second circular queues are comprised in a peripheral component interconnect (PCI) system.

28. The computer system of claim 19, wherein the first and second circular queues are comprised in an order enforcement mechanism.

29. The computer system of claim 19, wherein the core logic comprises a North Bridge connected to the CPU, the North Bridge including the first and second circular queues.

30. The computer system of claim 29, wherein the North Bridge comprises a host-to-PCI bridge.

31. The computer system of claim 19, further comprising acknowledge bits in the first circular queue for maintaining the ordering dependency.

32. The computer system of claim 31, wherein the acknowledge bits comprise random access memory (RAM), flip-flops, or register files.

33. The computer system of claim 19, wherein the first counter rolls over to zero only once before the second counter rolls over to zero.

34. The computer system of claim 19, further comprising other circular queues, wherein the second circular queue has the same ordering dependency on these other circular queues, and wherein dequeuing requirements of that ordering dependency must be satisfied relative to all the other queues before the second circular queue can be dequeued.

35. The computer system of claim 19, wherein the first and second circular queues use look-ahead or pipelining techniques.

36. A method of implementing an inter-queue ordering mechanism between different queues of a computer system, the method comprising:
   enqueuing transaction entries in a first circular queue in the computer system;
   enqueuing additional transaction entries in a second circular queue in the computer system;
   ordering the dequeuing of transaction entries in the first and the second circular queues, the ordering comprising preventing the additional transaction entries in the second queue from passing the transaction entries in the first circular queue; and
   incrementing a first counter and a second counter whenever an entry is enqueued to or dequeued from the first circular queue.

37. The method of claim 36, further comprising incrementing the first counter and rolling the first counter over to zero after a maximum value of the first counter is reached.

38. The method of claim 36, further comprising incrementing the second counter and rolling the second counter over to zero after a maximum value of the second counter is reached.

39. The method of claim 36, wherein the ordering comprises rolling the first counter over to zero only once before the second counter rolls over to zero.

40. A device for implementing an inter-queue transaction ordering mechanism of a computer system, comprising:
   first queue means for holding transaction entries;
   second queue means for holding other transaction entries;
   means for ordering transaction handling between the first and the second queue means such that entries in the second queue means are not allowed to pass entries in the first queue means; and
   means for incrementing a counting means whenever an entry is enqueued to or dequeued from the first queue means.

41. The device of claim 40, wherein the first and the second queue means comprise first-in-first-out (FIFO) memory means for holding the transactions.

42. The device of claim 41, wherein the first queue means further comprises randomly accessed memory elements.

43. The device of claim 41, wherein the FIFO memory means comprises random access memory (RAM), flip-flops, or register files as a building block.

44. The device of claim 40, wherein the counting means comprises a first counter and a second counter, the first and the second counters adapted to increment whenever an entry is enqueued to or dequeued from the first queue means.

* * * * *

UNITED STATES PATENT AND TRADEMARK OFFICE
CERTIFICATE OF CORRECTION

| | |
|---|---|
| PATENT NO. | : 7,139,859 B2 |
| APPLICATION NO. | : 10/039130 |
| DATED | : November 21, 2006 |
| INVENTOR(S) | : Jaideep Dastidar et al. |

It is certified that error appears in the above-identified patent and that said Letters Patent is hereby corrected as shown below:

In column 11, line 22, in Claim 20, delete "(FIPO)" and insert -- (FIFO) --, therefor.

Signed and Sealed this

Twenty-eighth Day of July, 2009

JOHN DOLL
*Acting Director of the United States Patent and Trademark Office*